(12) United States Patent
Sandmæl

(10) Patent No.: US 6,663,277 B1
(45) Date of Patent: Dec. 16, 2003

(54) APPARATUS FOR CALIBRATION OF TEMPERATURE SENSORS

(75) Inventor: Eric Sandmæl, Stavern (NO)

(73) Assignee: Instrutek Holding, AS, Larvik (NO)

( * ) Notice: Subject to any disclaimer, the term of this patent is extended or adjusted under 35 U.S.C. 154(b) by 0 days.

(21) Appl. No.: 09/463,029

(22) PCT Filed: Jul. 17, 1998

(86) PCT No.: PCT/NO98/00218
§ 371 (c)(1),
(2), (4) Date: Jan. 23, 2001

(87) PCT Pub. No.: WO99/04231
PCT Pub. Date: Jan. 28, 1999

(30) Foreign Application Priority Data

Jul. 18, 1997 (NO) ................................. 973345

(51) Int. Cl.⁷ ............................................. G01K 15/00
(52) U.S. Cl. ................................. 374/3; 374/1
(58) Field of Search ......................... 374/1, 2, 3

(56) References Cited

U.S. PATENT DOCUMENTS

| | | | | |
|---|---|---|---|---|
| 2,299,867 A | * | 10/1942 | Wolfson | 374/3 |
| 3,099,878 A | * | 8/1963 | Woods | 374/1 |
| 3,699,800 A | * | 10/1972 | Waldron | 73/1 F |
| 3,738,174 A | * | 6/1973 | Waldron | 374/1 |
| 4,050,289 A | * | 9/1977 | Fairbairn et al. | 73/1 |
| 4,244,207 A | * | 1/1981 | Staunton | 73/1 F |
| 4,545,690 A | * | 10/1985 | Zysman et al. | 374/165 |
| 4,901,257 A | * | 2/1990 | Chang et al. | 374/1 |
| 6,050,723 A | * | 4/2000 | Amra | 374/140 |
| 6,139,180 A | * | 10/2000 | Usher et al. | 374/1 |
| 6,193,411 B1 | * | 2/2001 | Chen | 374/2 |
| 6,293,695 B1 | * | 9/2001 | Schmermund | 374/1 |

FOREIGN PATENT DOCUMENTS

| | | | | |
|---|---|---|---|---|
| FR | 2 590 981 A1 | * | 6/1987 | 374/1 |
| GB | 2 114 293 A | * | 8/1983 | G01K/15/00 |
| JP | 08247861 A | * | 9/1996 | G01K/15/00 |
| JP | 2001004461 A | * | 1/2001 | G01K/15/00 |

* cited by examiner

Primary Examiner—Diego Gutierrez
Assistant Examiner—Mirellys Jagan
(74) Attorney, Agent, or Firm—John W. Montgomery; Haynes and Boone, LLP.

(57) ABSTRACT

There are provided an apparatus for temperature calibration of temperature sensors, and a liner for use in such an apparatus, wherein the liner (9) is adapted to be placed in a cavity (5) in a dry block (1) in the apparatus, and is arranged to receive at least one sensor to be calibrated. The liner has a cavity (10) which is adapted to receive a heat transferring liquid (11) and one or more sensors (13, 14) in the liquid-filled cavity (10). The liner preferably constitutes a container having an open end which is provided with a cap (12) for closing the container.

12 Claims, 3 Drawing Sheets

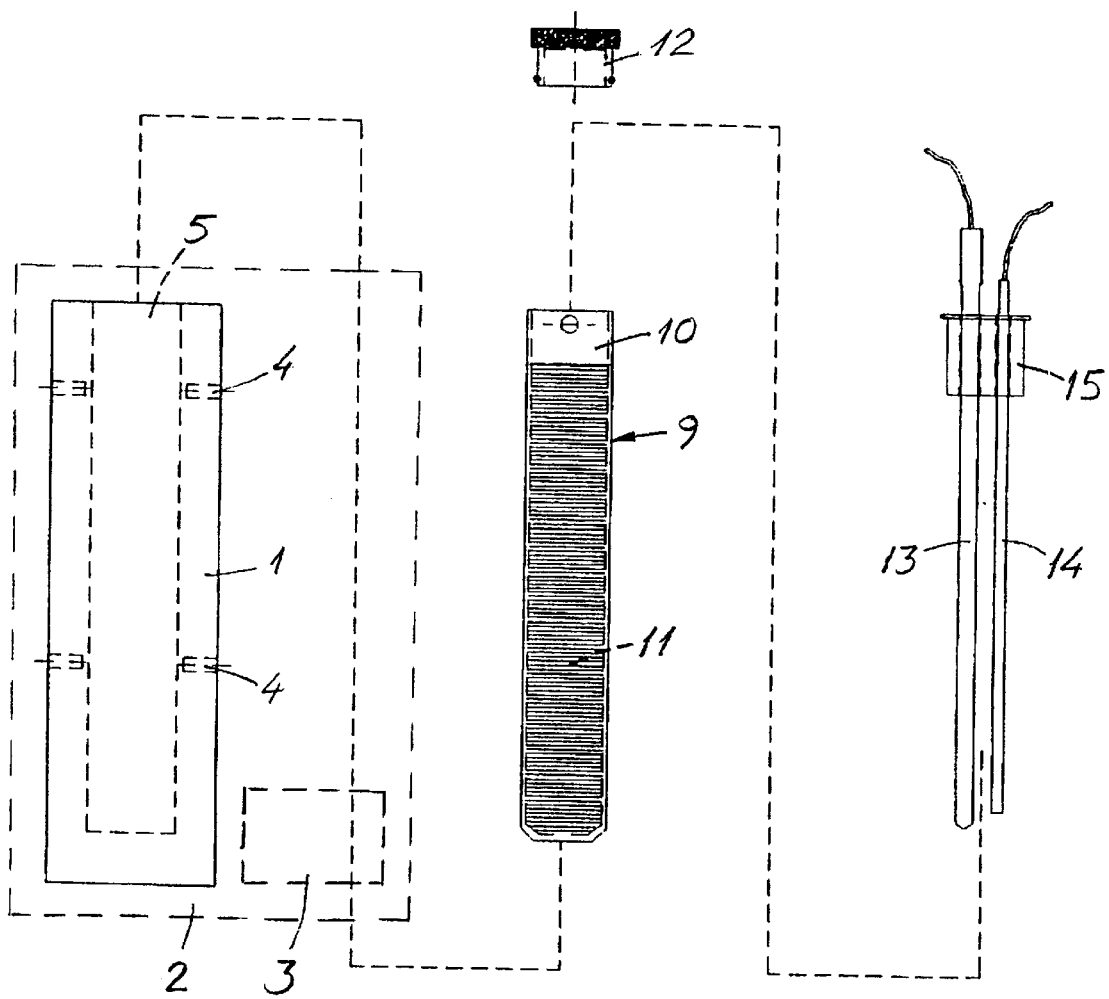
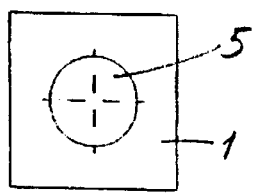
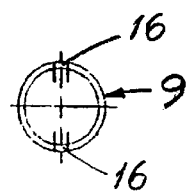
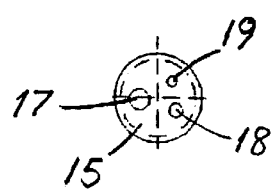
FIG. 3  FIG. 4  FIG. 5

APPARATUS FOR CALIBRATION OF TEMPERATURE SENSORS

The invention relates to an apparatus for temperature calibration of temperature sensors, comprising a housing unit containing at least one dry block having a cavity for receiving a sensor-receiving liner, and a heating/cooling means for the provision of an accurate temperature of the dry block.

Further, the invention relates to a liner for use in such an apparatus.

As components and equipment age, and also are subjected to temperature changes and mechanical strains, the critical capacity will decrease. This is called drift. When this happens, one can no longer rely on previous capacity tests, and this may result in a poorer quality in development and production. Since one can not prevent drift, one must instead detect and eliminate the effect thereof by means of calibration.

As known, calibration is to compare the capacity of an equipment with a known standard. The standards are maintained by national and international accredited calibration laboratories.

Today, there are imposed aggravated demands on the industry with respect to measuring accuracy and quality assurance (ISO 9000), and there is then required calibrating equipment which satisfies the requirement of today and complies with the new standards within temperature calibration.

The known devices for calibration of temperature sensors generate an accurate temperature in a portable unit which can be operated equally simple out on the topical installation as in on the laboratory. Even if temperature calibrators according to the prior art are very accurate and accepted, they are today utilizing equipment which is relatively space demanding and expensive in purchase, and which requires a long time for temperature stabilization.

The known devices of the topical type are based on the use of a dry block having a cavity for receiving a liner or sleeve in the form of a massive body which is provided with a central, elongated cavity for introduction of the topical temperature detector or sensor to be calibrated. The elongated cavity is adapted for accurate reception of the topical sensor, to secure an accurate temperature and a correct calibration, and thus is limited to calibration of sensors having the correct dimensions.

There also exist liquid-based temperature calibrators with a housing unit having a recess which, in use, can be filled with a liquid to form a liquid bath for submersion of the temperature sensor to be calibrated. However, such a calibrator must be emptied of liquid and possibly be cleaned for each use, and in order to be able to be transported, and thus is not so easy and practical to use as desired.

It is an object of the invention to provide a temperature calibration apparatus which will give dry block calibrators an extended field of use by being able to calibrate a wider spectrum of temperature detectors or sensors, and which simultaneously secure a more accurate and more stable calibration.

A further object of the invention is to provide a liner giving substantial advantages of use when utilized in such an apparatus.

For the achievement of the above-mentioned objects there is provided an apparatus of the introductorily stated type which, according to the invention, is characterized in that at least one sensor-receiving liner is a cylindrical body which is adapted to the dry block cavity and is arranged to be filled with a heat transferring liquid.

An advantageous embodiment of the apparatus is characterized in that the liner body is a container which is open at one end, the open end being provided with a cap for closing of the container. With this embodiment the liquid-filled liner can be transported without one having to pour out the liquid.

According to the invention there is also provided a liner for use in an apparatus for calibration of temperature sensors, wherein the liner is adapted to be placed in a cavity in a dry block in the apparatus and is arranged to receive at least one sensor to be calibrated, which liner is characterized in that it has a cavity which is adapted to receive a heat transferring liquid and one or more sensors in the liquid-filled cavity.

In the apparatus according to the invention a standard dry block liner is replaced by a liquid-filled liner, and consequently one combines a dry block calibrator and a liquid bath calibrator in one and the same unit. The invention gives a liquid-based temperature calibrator a mobility and a combination possibility which do not exist today. The liquid-filled liner can be placed in the same cavity or hole in the housing unit as that which is today used for the placing of standard sensor-receiving liners. By means of the apparatus according to the invention liquid temperature calibration is carried out in the field outside of the laboratories, and the apparatus enables a simpler and more accurate calibration of temperature sensors.

The invention will be further described below in connection with an exemplary embodiment with reference to the drawings, wherein FIG. 1 shows a schematic view of a dry block calibrator having elements according to the prior art;

FIG. 2 shows elements of a dry block calibrator having a liner according to the invention;

FIGS. 3–5 show plan views of the respective elements shown in FIG. 2; and

In the drawings, corresponding parts and elements in the different Figures are designated by the same reference numerals.

Figure 1:
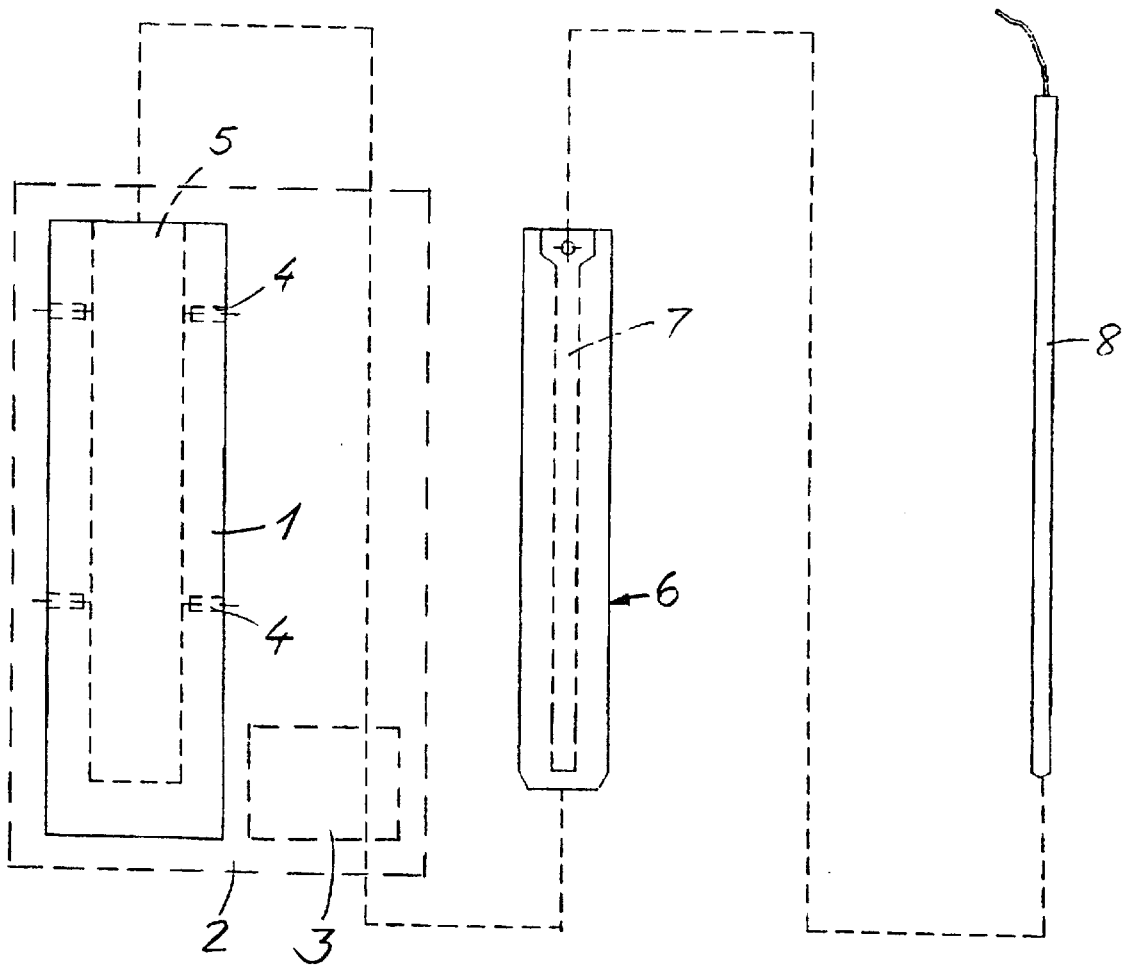

In FIG. 1, which shows elements of a calibrating apparatus according to the prior art, there is shown a so-called dry block 1 arranged in a suitable housing unit 2 which is only schematically shown. The housing unit is provided with a heating/cooling means 3 (only symbolically suggested as a block) for heating or cooling of the dry block, and with the necessary electronic and other means (not shown) for measuring and transferring the desired measuring signals to an external processing equipment.

The dry block 1 is shown to be provided with a number of external assembly holes 4, and it is further provided with a suitable cavity or hole 5 for the reception of a sleeve or liner 6. This liner is a standard liner in the form of an essentially massive metal body which is provided with a central elongated cavity 7 for introduction of the topical temperature sensor 8 which is to be calibrated. The cavity 7 is dimensioned and adapted for close-fitting accurate reception of the sensor 8.

In the embodiment according to the invention shown in FIG. 2, the standard liner in FIG. 1 is replaced by a liner 9 defining a cavity 10 which is adapted to be filled with a heat-transferring liquid 11. In the illustrated embodiment, the liner 9 is a cylindric, tubular or sleeve-shaped body in the form of a container having a closed bottom end and an open upper end, and which externally is dimensionally adapted to be received in a close-fitting manner in the cavity 5 of the dry block 1. The open end of the container can be closed by means of a suitable plug or cap 12, so that the liquid-filled liner can be transported from place to place without having to pour out the liquid.

By utilizing a liquid-filled liner one can, with one and the same liner, calibrate one or more sensors without the cavity of the liner being dimensionally adapted to the sensors. The liquid, which in use surrounds the sensor or sensors to be calibrated, in addition ensures a stable and safe heat transfer, and thereby a precise calibration. In addition, the liner is easy to clean, and it can be exchanged or replaced by another liner in a simple manner.

As shown in FIG. 2, the liner 9 for example may receive two sensors 13 and 14 kept in place in the liner by means of a sensor holder or sensor guide 15.

The liner 9 for example may be manufactured from a suitable brass alloy, or from aluminum. The heat-transferring liquid normally will be an oil of a suitable type, according to the use and the topical calibration temperature.

FIGS. 3–5 show plan views (viewed from above) of the dry block 1, the liner 9 and the sensor holder 15, respectively. As appears from FIG. 4, the liner at its upper end is provided with a pair of diametrically opposite holes 16 for the reception of holding pins on a clip (not shown) for lifting of the liner when this is in a heated condition. As further appears from FIG. 5, the holder 15, in addition to holes 17 and 18 for receiving the sensors 13 and 14, is provided with an additional hole 19 for the reception of a possible third sensor (not shown).

Figure 6:
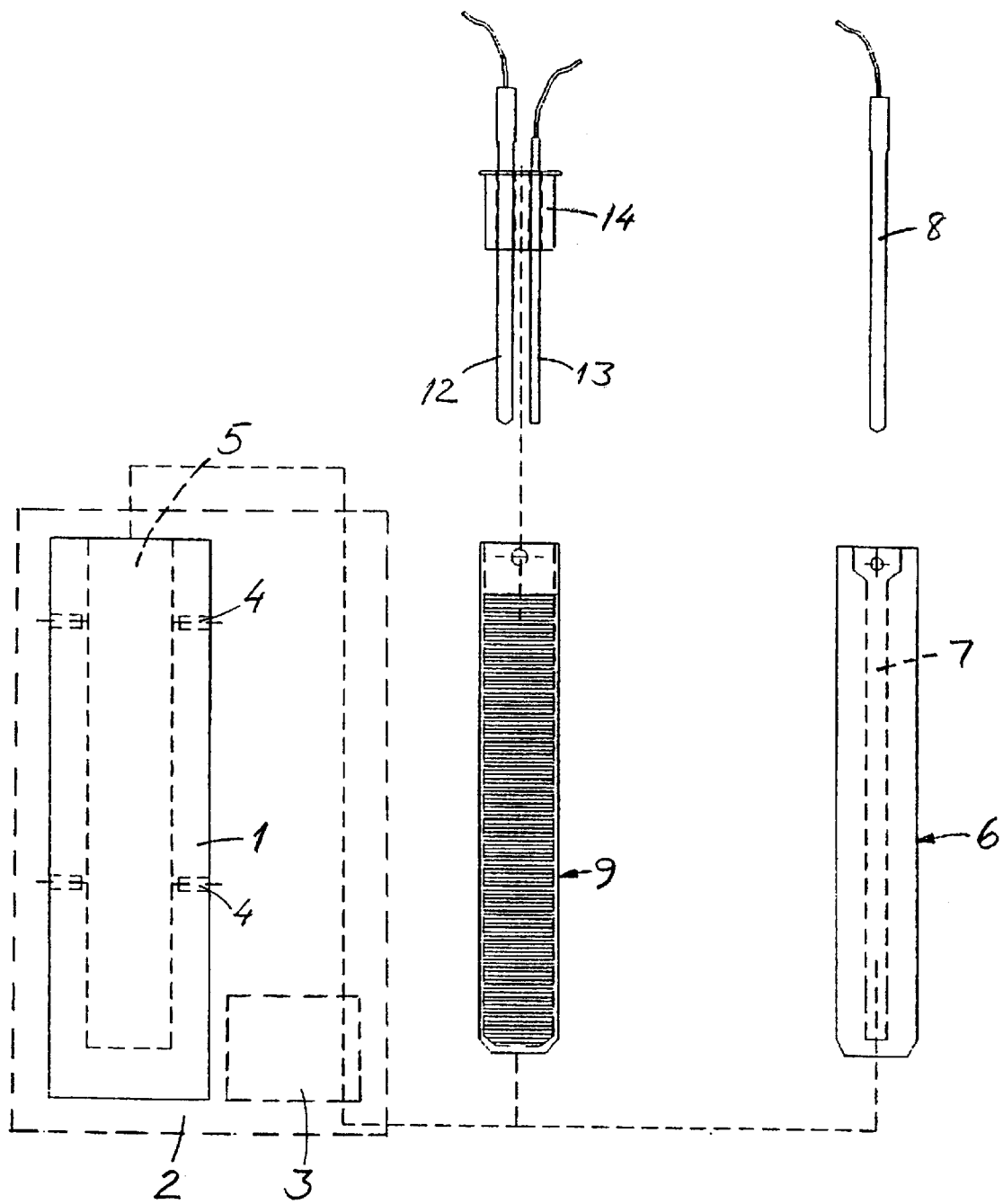
FIG. 6 shows elements of a dry block calibrator comprising a liquid-filled liner as well as a standard liner.

If desired, the calibrating apparatus according to the invention may be provided with more than one dry block for the reception of the respective liners. The liners may consist of liquid-filled liners according to the invention, possibly supplemented by standard liners of the aforementioned type. Such an embodiment is schematically illustrated in FIG. 6. The Figure shows a liquid-filled liner 9 and a standard liner 6 which are combined with a single dry block 1 but which, as an alternative, may be used in connection with respective dry blocks.

What is claimed is:

1. A liner for use in an apparatus for calibration of temperature sensors, wherein the liner (9) being dimensioned to be placed in a cavity (5) in a heat conducting dry block (1) in the apparatus and in close fitting heat conducting contact with the heat conducting dry block (1) and the liner (9) being arranged to receive at least one sensor (13 resp. 14) to be calibrated, characterized in that the liner (9) is a heat conducting cylindrical body in the form of a replaceable container having an open upper end and which has a cavity (10) which is arranged to be filled with a heat-transferring liquid (11) and to receive at least one sensor (13 resp. 14) to be calibrated, so that the sensor is surrounded by the heat-transferring liquid during a calibration operation.

2. The liner according to claim 1, characterized in that the open end of the container is provided with a cap (12) for closing of the container.

3. The liner according to claim 1, characterized in that the liner (9) is dimensioned to receive more than one sensor (13, 14).

4. The liner according to claim 1, characterized in that the liner (9) includes a holder plug (15) being dimensioned to be placed in the open end of the container, and having at least one hole (17, 18, 19) for receiving and guiding at least one sensor (13, 14) to be calibrated.

5. The liner according to claim 4, characterized in that the holder (15) has more than one hole (17, 18, 19) for receiving and guiding more than one sensor (13, 14) to be calibrated.

6. An apparatus for temperature calibration of temperature sensors, comprising a housing unit (2) containing at least one heat conducting dry block (1) having a cavity (5) for receiving a sensor-receiving liner (9), the liner (9) being dimensioned to be received in a close fitting manner in the cavity (5) for heat conduction with the dry block (1), and a heating/cooling means (3) for provision of an accurate temperature to the dry block (1), characterized in that the sensor-receiving liner (9) is a heat conducting cylindrical body in the form of a replaceable container dimensioned for close fitting heat conducting contact with the heat conducting dry block and having an open end and being arranged to be filled with a heat-transferring liquid (11) and to receive at least one sensor (13 resp. 14) to be calibrated, so that the sensor is surrounded by the heat-transferring liquid during calibration.

7. The apparatus according to claim 6, characterized in that the liner (9) is dimensioned to receive more than one sensor (13, 14).

8. The apparatus according to claim 6, in which the liner (9) contains a heat-transferring liquid (11).

9. The apparatus according to claim 6, characterized in that the open end of the container is provided with a cap (12) for closing of the container.

10. The apparatus according to claim 9, characterized in that the liner (9) includes a holder plug (15) being dimensioned to be placed in the open end of the container, and having at least one hole (17, 18, 19) for receiving and guiding at least one sensor (13, 14) to be calibrated.

11. The apparatus according to claim 10, characterized in that the holder (15) has more than one hole (17, 18, 19) for receiving and guiding more than one sensor (13, 14) to be calibrated.

12. A method of calibrating temperature sensors using an apparatus comprising a housing unit (2) containing a least one heat conducting dry block (1) having a cavity (5) for close-fitting reception of a sensor-receiving liner (9), comprising:

placing a sensor-receiving liner (9), which is in the form of a heat conducting replaceable container having an open upper end, in the cavity (5) of the heat conducting dry block (1), filling said container (9) with a heat-transferring liquid (11), and introducing at least one sensor (13 resp. 14) into the heat-transferring liquid (11) in the heat conducting container (9), so that the sensor (13, 14) is surrounded by the heat-transferring liquid (11) during the calibrating operation.

* * * * *